(12) United States Patent
Lee

(10) Patent No.: US 7,570,066 B2
(45) Date of Patent: Aug. 4, 2009

(54) SIMULTANEOUS DETECTION OF IN-PLANE AND OUT-OF-PLANE POSITION DISPLACEMENT WITH CAPACITIVE SENSORS

(75) Inventor: Juil Lee, Sewickley, PA (US)

(73) Assignee: Seagate Technology LLC, Scotts Valley, CA (US)

(*) Notice: Subject to any disclaimer, the term of this patent is extended or adjusted under 35 U.S.C. 154(b) by 2 days.

(21) Appl. No.: 11/933,729

(22) Filed: Nov. 1, 2007

(65) Prior Publication Data
US 2009/0115429 A1    May 7, 2009

(51) Int. Cl.
G01R 27/26 (2006.01)

(52) U.S. Cl. .................. 324/662; 324/679; 324/686; 73/504.02; 73/514.16; 73/862.625; 702/104

(58) Field of Classification Search .................. 324/662
See application file for complete search history.

(56) References Cited

U.S. PATENT DOCUMENTS

| 4,241,995 | A | 12/1980 | Takahama |
| 4,420,754 | A | 12/1983 | Andermo |
| 4,426,616 | A | 1/1984 | Maier |
| 4,437,055 | A | 3/1984 | Meyer |
| 4,543,526 | A | 9/1985 | Burckhardt et al. |
| 4,733,235 | A | 3/1988 | Baer et al. |
| 5,023,559 | A | 6/1991 | Andermo |
| 6,194,903 | B1 | 2/2001 | Schulz |

(Continued)

FOREIGN PATENT DOCUMENTS

EP    0457515    11/1991

(Continued)

OTHER PUBLICATIONS

"What is a Lock-in Amplifier?", Technical Note, TN 1000, 4 pgs. copyright Perkin Elmer, 2000.

Primary Examiner—Vincent Q Nguyen
Assistant Examiner—Benjamin M Baldridge
(74) Attorney, Agent, or Firm—Robert P. Lenart, Esq.; Pietragallo Gordon Alfano Bosick & Raspanti, LLP

(57) ABSTRACT

An apparatus includes a first capacitive sensor connected to a first supply voltage, a second capacitive sensor connected to a second supply voltage, a sensing circuit for producing a sense voltage in response to current flowing in the first and second capacitive sensors, a first mixer for combining the sense voltage with a first reference voltage to produce a first signal representative of in-plane displacement between electrodes of the first and second capacitive sensors, and a second mixer for combining the sense voltage with a second reference voltage to produce a second signal representative of out-of-plane displacement between the electrodes of the first and second capacitive sensors.

18 Claims, 10 Drawing Sheets

U.S. PATENT DOCUMENTS

| | | | |
|---|---|---|---|
| 5,237,284 A | 8/1993 | Van Der Valk | |
| 5,481,914 A * | 1/1996 | Ward | 73/504.16 |
| 5,661,240 A | 8/1997 | Kemp | |
| 5,672,949 A * | 9/1997 | Ward | 318/609 |
| 5,703,292 A * | 12/1997 | Ward | 73/504.02 |
| 5,896,032 A | 4/1999 | Yagi et al. | |
| 6,025,726 A * | 2/2000 | Gershenfeld et al. | 324/671 |
| 6,031,380 A | 2/2000 | Gleixner et al. | |
| 6,181,050 B1 * | 1/2001 | Taussig et al. | 310/309 |
| 6,366,099 B1 | 4/2002 | Reddi | |
| 6,700,391 B2 | 3/2004 | Strack et al. | |
| 7,142,500 B2 | 11/2006 | Fasen et al. | |
| 7,212,488 B2 | 5/2007 | Gibson et al. | |
| 2003/0030570 A1 * | 2/2003 | Netzer | 340/870.37 |
| 2005/0092107 A1 * | 5/2005 | Eskridge | 73/862.626 |
| 2006/0022866 A1 * | 2/2006 | Walton et al. | 342/194 |
| 2008/0020728 A1 * | 1/2008 | Zhuo et al. | 455/313 |

FOREIGN PATENT DOCUMENTS

| | | |
|---|---|---|
| EP | 1219934 | 7/2002 |
| EP | 1278068 | 1/2003 |

* cited by examiner

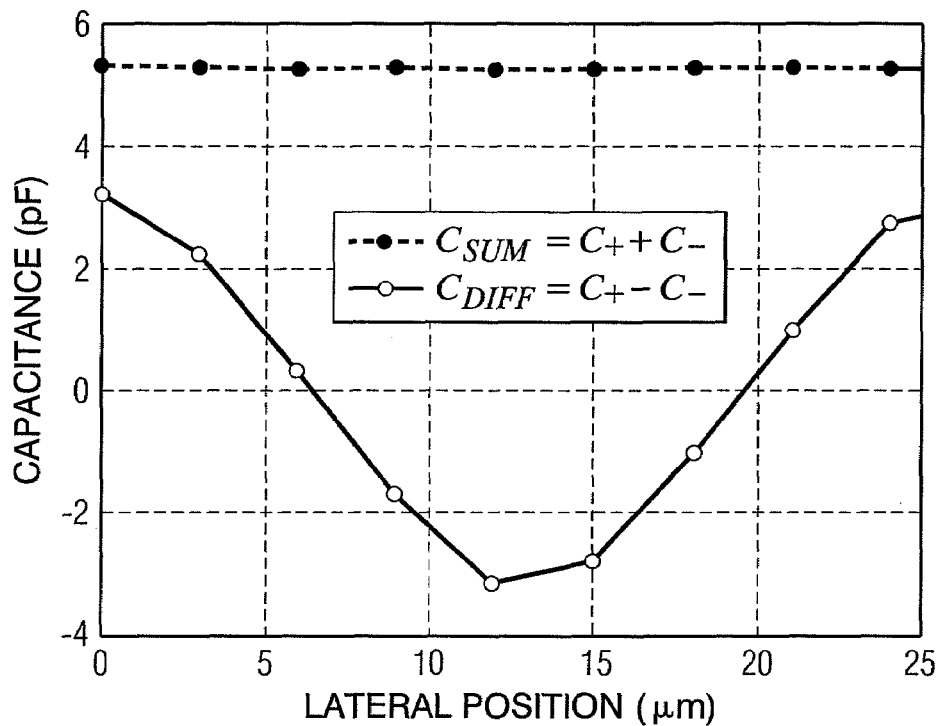
FIG. 8  (L,d)=(10μm,3μm)
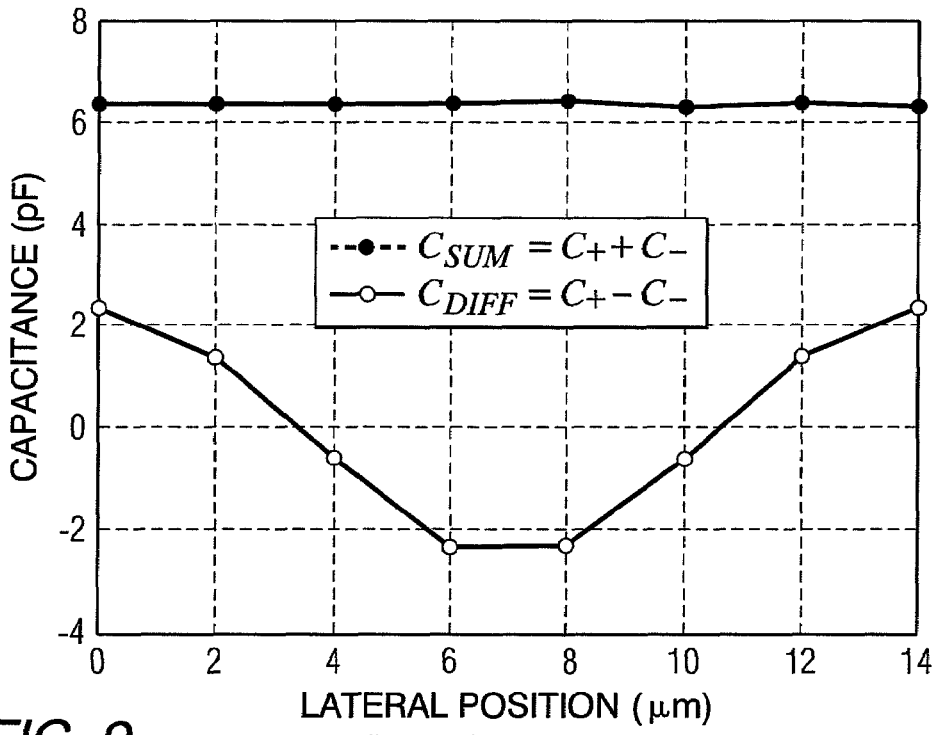
FIG. 9  (L,d)=(5μm,2μm)

SIMULTANEOUS DETECTION OF IN-PLANE AND OUT-OF-PLANE POSITION DISPLACEMENT WITH CAPACITIVE SENSORS

BACKGROUND

In many systems, it is desirable to measure relative displacement between two members. One example is a probe type data storage device. Probe type data storage devices can provide high storage capacity in a very small form factor (e.g., an SD card). Such devices include an array of probe tips, or heads, that are used to read and write data to a storage media, such as a ferroelectric media. Each tip may operate on a specified area of the storage media. Relative movement between the media and the tips can be implemented using actuators, such as electromagnetic actuators or electrostatic actuators, which are coupled to the media or a support structure for the media or the tips. In one example, the media can be moved in first and second directions (i.e., scanning and tracking directions) that are orthogonal to each other. Data are stored in tracks on the storage media. In the scanning direction the actuators move the media at a resonant frequency to achieve a high data rate, while in a tracking direction a tracking control is used to enable data storage in a high number of tracks per inch.

The desired track width can be on the order of tens of nanometers, which places difficult requirements on the accuracy of a servo system, which controls the relative position of the media and the tips. In order to achieve this nano-precision servo accuracy, a sub-nanometer precision position sensing is needed. Position sensing can be accomplished using a combination of capacitive sensors and embedded servo marks. The capacitive sensors may provide the primary sensing of a relative position of the tips and media, and the embedded servo marks on a non-active part of media may provide secondary sensing of the position of each tip.

SUMMARY

In a first aspect, the invention provides an apparatus including a first capacitive sensor connected to a first supply voltage, a second capacitive sensor connected to a second supply voltage, a sensing circuit for producing a sense voltage in response to current flowing in the first and second capacitive sensors, a first mixer for combining the sense voltage with a first reference voltage to produce a first signal representative of in-plane displacement between electrodes of the first and second capacitive sensors, and a second mixer for combining the sense voltage with a second reference voltage to produce a second signal representative of out-of-plane displacement between the electrodes of the first and second capacitive sensors.

In another aspect, the invention provides an apparatus including a first capacitive sensor connected to a first supply voltage having a first component at a first frequency and a second component at a second frequency, a second capacitive sensor connected to a second supply voltage having a first component at the first frequency and a second component at the second frequency, a sensing circuit for producing a sense voltage in response to current flowing in the first and second capacitive sensors, a first mixer for combining the sense voltage with a first reference voltage to produce a first signal representative of in-plane displacement between electrodes of the first and second capacitive sensors, and a second mixer for combining the sense voltage with a second reference voltage to produce a second signal representative of out-of-plane displacement between the electrodes of the first and second capacitive sensors.

In another aspect, the invention provides a method including: connecting a first capacitive sensor to a first supply voltage, connecting a second capacitive sensor to a second supply voltage, producing a sense voltage in response to current flowing in the first and second capacitive sensors, combining the sense voltage with a first reference voltage to produce a first signal representative of in-plane displacement between electrodes of the first and second capacitive sensors, and combining the sense voltage with a second reference voltage to produce a second signal representative of out-of-plane displacement between the electrodes of the first and second capacitive sensors.

These and various other features and advantages will be apparent from a reading of the following detailed description.

BRIEF DESCRIPTION OF THE DRAWINGS

FIGS. 8 and 9 are graphs of capacitance versus lateral position.

DETAILED DESCRIPTION OF THE INVENTION

Figure 1:
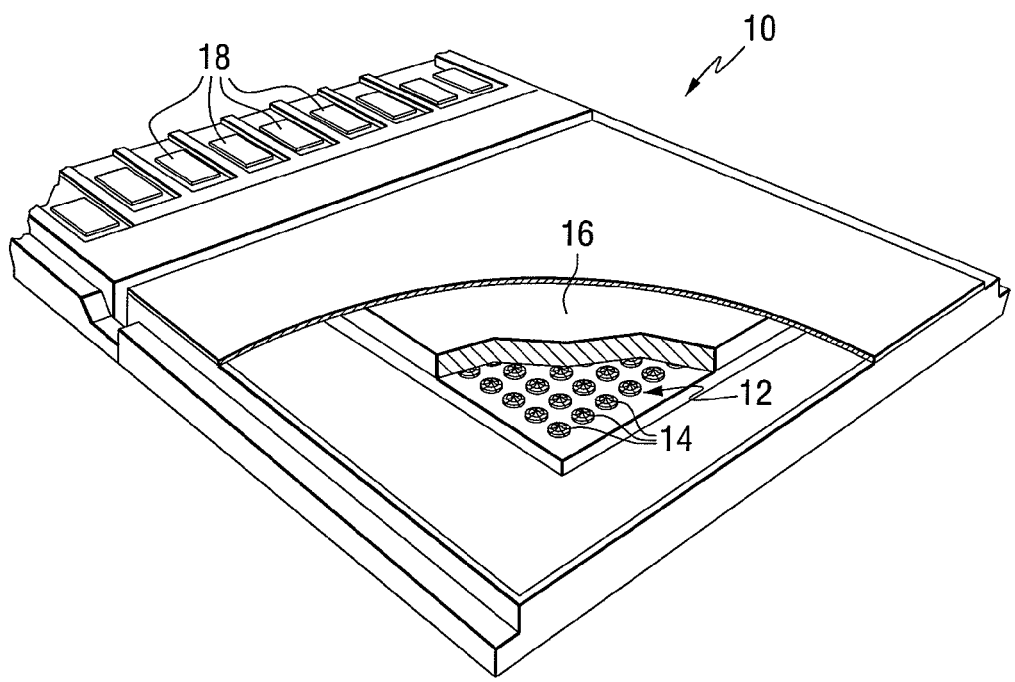
FIG. 1 is a perspective view of a probe storage device that can be constructed in accordance with an aspect of the invention.

Referring to the drawings, wherein like numbers denote like items in the various figures, FIG. 1 is a perspective view of a data storage device 10 that can include a capacitive sensor constructed in accordance with an aspect of the invention. In the storage device 10 of FIG. 1, an array 12 of transducers 14, also called probes, tips or heads, are positioned adjacent to a storage media 16. The ends of the transducers 14 and a recording surface of the storage media 16 lie in planes that are generally parallel to each other. The transducers 14 are electrically connected to connectors 18 through control circuitry, not shown. The storage media 16 or the transducer array can be coupled to at least one actuator (not shown in this view), which is configured to move the storage media 16 relative to array 12. This movement causes individual storage locations or domains on storage media 16 to be moved relative to the transducers. Each transducer can include one or more electrodes. The storage media in the example of FIG. 1 can be, for example, a ferroelectric, magnetic or optical storage media. However, the invention is not limited to any particular type of storage media.

Figure 2:
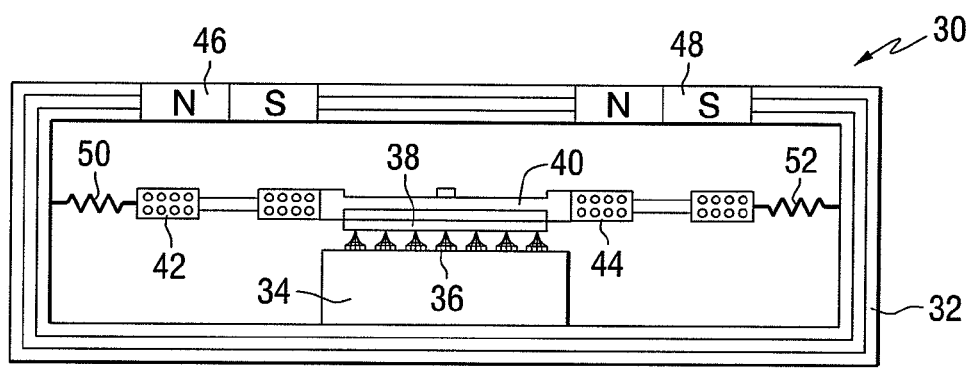
FIG. 2 is a cross-sectional view of a probe storage device.

FIG. 2 is a cross-sectional view of a probe storage device 30 that includes actuators and a suspension assembly for providing relative movement between the storage media and an array of transducers. The device includes an enclosure 32, also referred to as a case, base, or frame, which contains a substrate 34. An array of transducers 36 is positioned on the substrate. In this example, the transducers extend upward to make contact with a storage media 38. The storage media 38 is mounted on a movable member, or sled 40. Relative movement between the storage media and the transducers is provided by electromagnetic actuators that include coils and magnets. Coils 42 and 44 are mounted on the movable member. Magnets 46 and 48 are mounted in the enclosure near the coils. Springs 50 and 52 form part of a suspension assembly that supports the movable member. The enclosure 32 can be formed of, for example, injection molded plastic. While FIG. 2 shows one example of a data storage device, it will be recognized that other known types of suspensions and actuators can be used to position the components and to provide relative movement between the transducers and the storage media. This invention is not limited to devices that use any particular type of transducer and storage media positioning and/or actuating devices.

Figure 3:
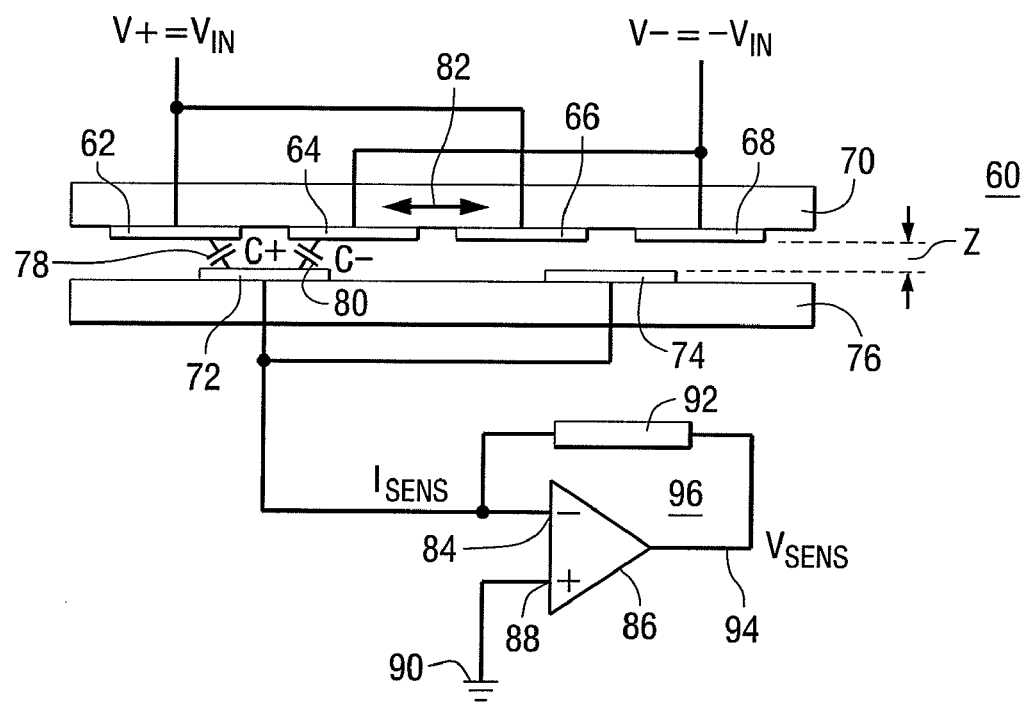
FIG. 3 is a schematic diagram of a capacitive position sensor.

FIG. 3 is a schematic diagram of a positioning sensing apparatus 60. In this example, electrodes 62, 64, 66 and 68 are mounted on a storage media 70, or a sled that supports the storage media. Electrodes 72 and 74 are mounted on a head substrate 76. The electrodes are separated in the Z-direction. Capacitance, as illustrated by capacitors 78 and 80, exists between the electrodes on the media and the substrate. Electrodes 62, 66, 72 and 74 form a first capacitive sensor, and electrodes 64, 68, 72 and 74 form a second capacitive sensor. The capacitance of the first capacitive sensor is C+, and the capacitance of the second capacitive sensor is C−.

As the media moves in the direction shown by arrow 82 (i.e., the in-plane direction), the capacitance between the electrodes changes. In addition, relative movement in the out-of-plane direction (i.e., substantially perpendicular to the plane of the media), results in additional changes in the capacitance between the electrodes.

In this example, a first supply voltage $V_{IN}$ is applied to electrodes 62 and 66, and a second supply voltage $-V_{IN}$ is applied to electrodes 64 and 68. The electrodes form two capacitor sensors, having capacitance C+ and C−, which are electrically connected in parallel with each other. Voltages $V_{IN}$ and $-V_{IN}$, sometimes referred to as modulating voltages, are applied to the two capacitor sensors from an external source, which can be, for example, a controller in a data storage device. Voltages $V_{IN}$ and $-V_{IN}$ can be alternating current voltages having the same frequency or different frequencies as described in the various examples below. The voltages can also be complex signals having both in-phase and out-of-phase (i.e., quadrature) components.

Electrodes 72 and 74 are connected to the inverting input 84 of an amplifier 86. The non-inverting input 88 of the amplifier is connected to ground 90. A feedback resistor 92 is provided between the amplifier output 94 and the inverting input. The amplifier and resistor form a sensing circuit 96. A sense current $I_{SENS}$ at the input to the amplifier results in a sense voltage $V_{SENS}$ at the amplifier output. The sense current is:

$$I_{SENS} = C_{DIFF} \frac{dV_{IN}}{dt}, \text{ where } C_{DIFF} = \frac{\varepsilon_0 (A_+ - A_-)}{Z},$$

where $C_{DIFF}$ is the change in capacitance as the sensing electrodes move relative to each other, $\varepsilon_0$ is the permittivity of free space, A is the area of the electrodes, and Z is the vertical distance between the electrodes. In this example, $A_+$ represents the area of electrodes 62 and 72, while $A_-$ represents the area of electrodes 64 and 72.

Figure 4:
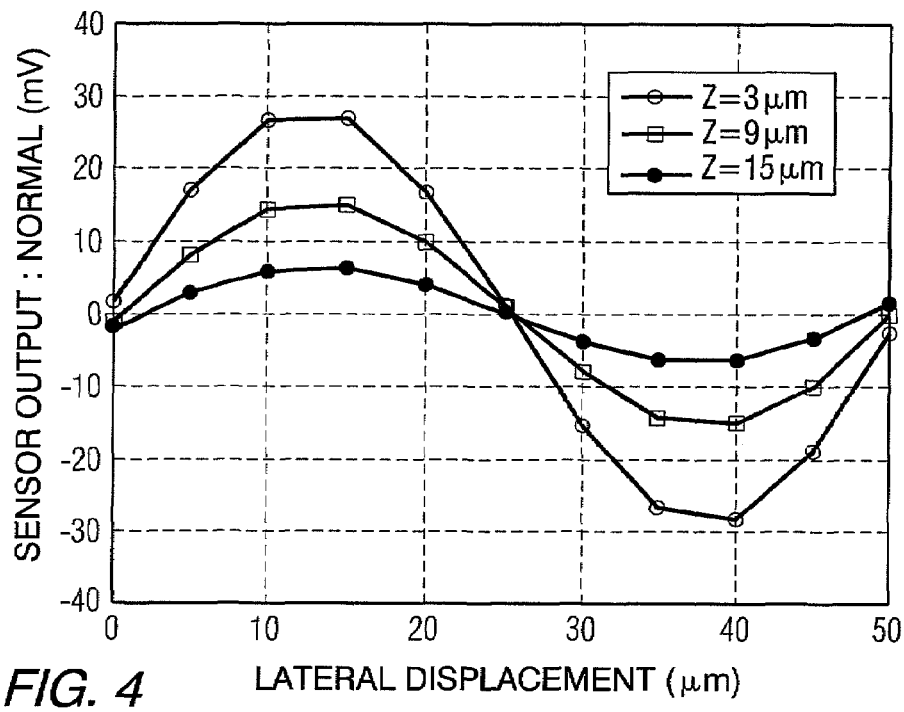
FIG. 4 is a graph of sensor output versus lateral displacement.
Figure 5:
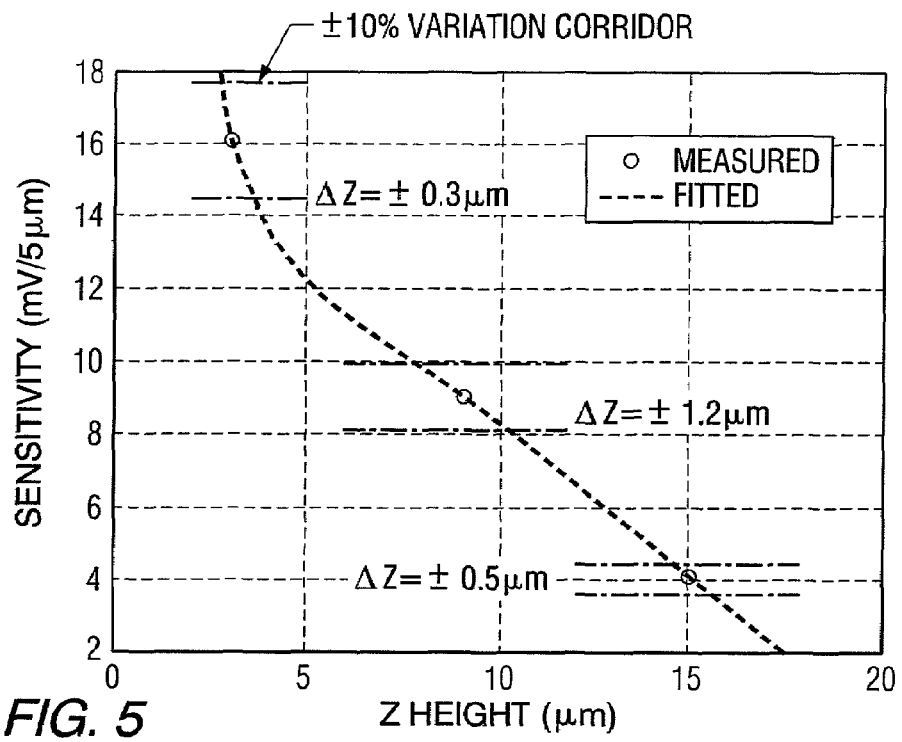
FIG. 5 is a graph of sensitivity versus height.

Capacitive sensor development in probe storage devices, particularly with non-micro-electromechanical system (MEMS) type actuators, poses two engineering challenges. High sensitivity is needed to detect a very small capacitance variation against much larger parasitic capacitance, and stable and robust operation is needed to cope with relatively large variations in the gap spacing between media and head. FIGS. 4 and 5 show measurement data for the capacitive sensor sensitivity variation for several Z-spacings between the head and media.

FIG. 4 is a graph of sensor output versus lateral displacement for an example sensor, for various separation distances Z. FIG. 5 is a graph of sensitivity (i.e., the ratio of sense voltage to lateral displacement) versus height. From FIGS. 4 and 5, it can be seen that, at Z=3 µm, the Z-spacing variation should be less than 0.3 µm for the sensor sensitivity change to be less than 10%. One measure for suppressing the Z-spacing variation in out-of-plane motion of the sensor electrodes caused by the actuator (e.g., a non-MEMS actuator) as well as external disturbances, is to use a mechanical stand-off, which can be called posts, together with a certain pre-load force (e.g., an electrostatic force from a capacitive sensor) between a media sled and a head substrate.

However, considering a mobile application of the probe storage device, as well as a rather fast and large stroke of a non-MEMS actuator (e.g., <250 µm), a certain amount of Z-spacing variation (e.g., a few µm) is unavoidable. This variation can cause a sensing error in in-plane position information.

Figure 6:
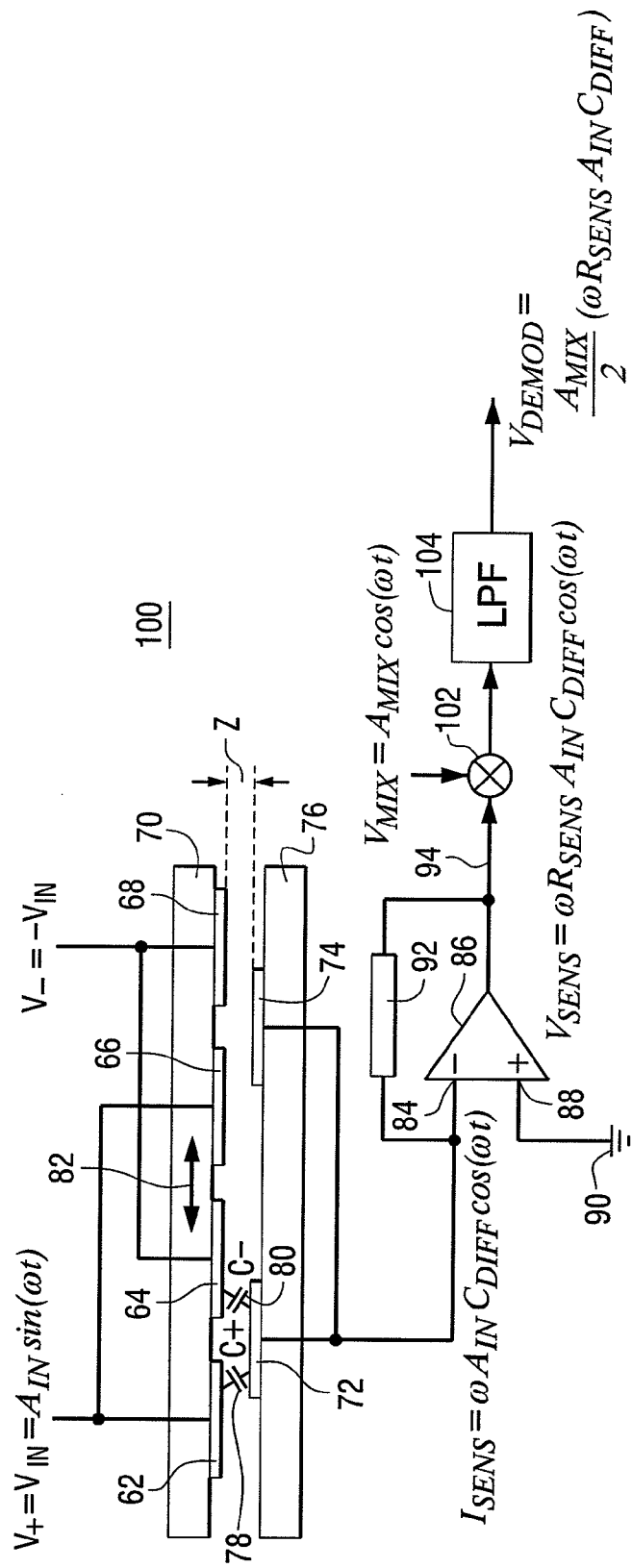
FIG. 6 is a schematic diagram of a capacitive position sensor.

In one aspect, this invention provides signal conditioning/processing to compensate for this Z-spacing variation. FIG. 6 is an example of a position sensor 100 using synchronous (e.g., sine-mixing or lock-in amplification) demodulation circuitry. In the example of FIG. 6, electrodes 62 and 66 are driven by a modulation voltage $V_{IN}=A_{IN}\sin(\omega t)$, and electrodes 64 and 68 are driven by a modulation voltage $-V_{IN}=-A_{IN}\sin(\omega t)$. This results in a sense current $I_{SENS}$ at the input to the sensing circuit amplifier of:

$$I_{SENS} = \omega A_{IN} C_{DIFF} \cos(\omega t), \text{ where } C_{DIFF} = \frac{\varepsilon_0 (A_+ - A_-)}{Z},$$

where $\omega$ is the frequency of the applied voltage. This results in a sensor signal $V_{SENS}$ of:

$$V_{SENS} = \omega R_{SENS} A_{IN} C_{DIFF} \cos(\omega t).$$

The sensor signal is multiplied by a reference signal, also called a mixing signal, ($V_{MIX}=A_{MIX}\cos(\omega t)$) in a mixer 102. The frequency and phase of the reference signal are the same as the current sense signal. The output of the mixer is then lowpass filtered by a filter 104 to produce a signal $V_{DEMOD}$, where:

$$V_{DEMOD} = \frac{A_{MIX}}{2}(\omega R_{SENS} A_{IN} C_{DIFF}).$$

The signal $V_{DEMOD}$ represents the carrier frequency component of the modulation voltage. In-plane displacement of the electrodes leads to a corresponding change in $C_{DIFF}$, which in turn results in a corresponding change in $V_{DEMOD}$.

The demodulation function of the circuit of FIG. 6 becomes very robust against other noises and interferences, which can have a broad frequency spectrum, and hence allows a very sensitive measurement result. While the circuit of FIG. 6 provides an indication of relative in-plane displacement of the capacitor sensor electrodes, there remains a need to address possible out-of-plane relative displacement of the capacitor sensor electrodes.

Figure 7:
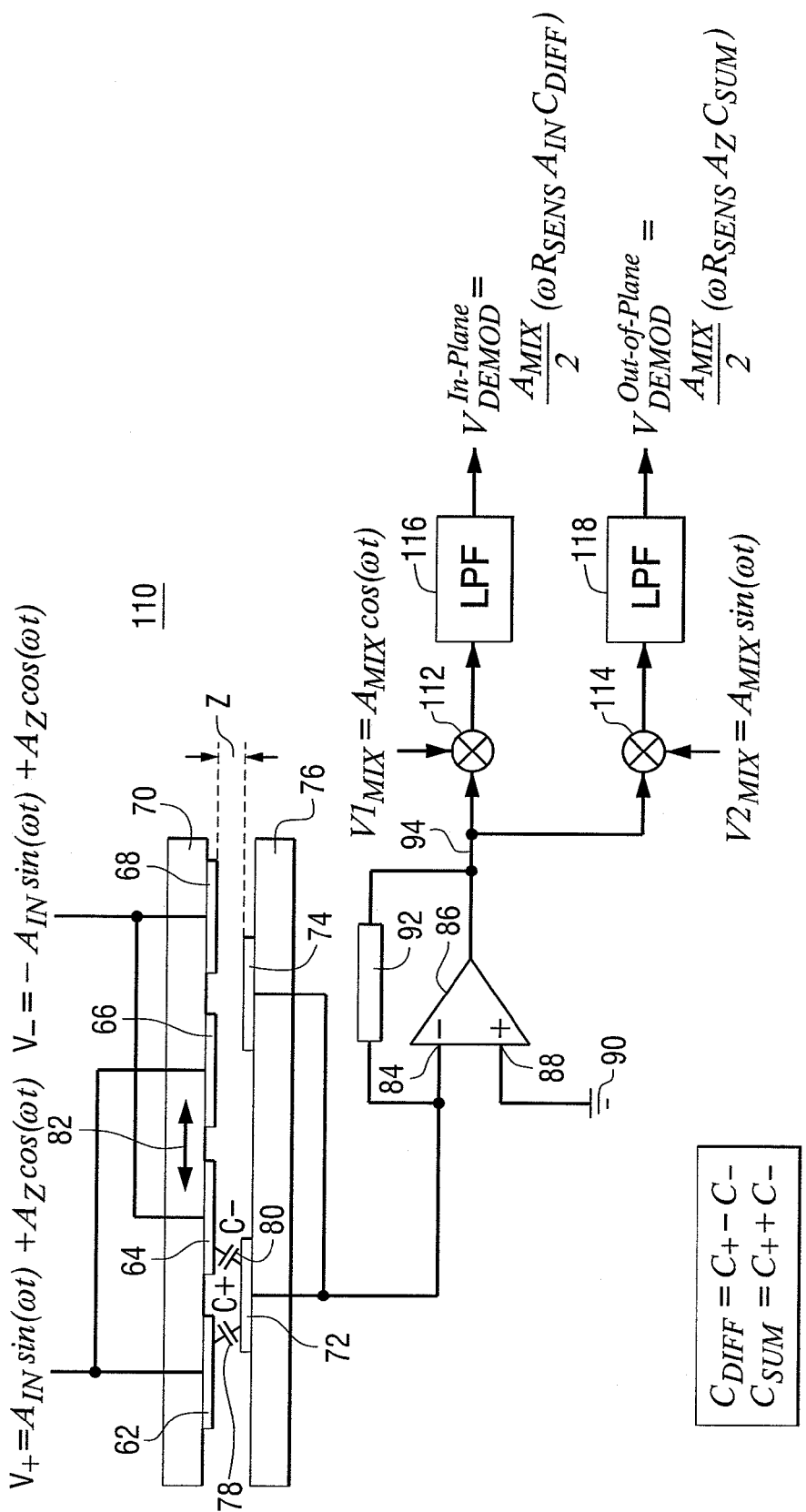
FIG. 7 is a schematic diagram of a capacitive position sensor constructed in accordance with an aspect of the invention.

FIG. 7 is a schematic drawing of an apparatus 110 providing simultaneous detection of in-plane and out-of-plane position displacement using capacitive sensors according to one aspect of the invention. The apparatus utilizes two orthogonal components (i.e., sine and cosine) of the applied voltage modulation frequency; one for in-plane and the other for out-of-plane position displacement detection, in a simultaneous manner.

In FIG. 7, electrodes 62 and 66 are driven by a voltage $V+=A_{IN}\sin(\omega t)+A_z\cos(\omega t)$, and electrodes 64 and 68 are driven by a voltage $V-=-A_{IN}\sin(\omega t)+A_z\cos(\omega t)$.

With these driving voltages, the sensing current becomes:

$$I_{SENS} = C_+\left(\frac{dV_+}{dt}\right) + C_-\left(\frac{dV_-}{dt}\right) =$$
$$(C_+ - C_-)\left(\frac{d(A_{IN}\sin(\omega t))}{dt}\right) + (C_+ + C_-)\left(\frac{d(A_{IN}\cos(\omega t))}{dt}\right),$$
$$\text{and } I_{SENS} = C_{DIFF}\left(\frac{d(A_{IN}\sin(\omega t))}{dt}\right) + C_{SUM}\left(\frac{d(A_{IN}\cos(\omega t))}{dt}\right),$$

in which the first term provides in-plane displacement information, and the second term provides out-of-plane displacement information. In this context, the quadrature component ($A_z\cos(\omega t)$) in the driving voltages $V_+$ and $V_-$, which should have the same polarity so that the out-of-plane displacement information, can be derived through the $C_{SUM}$ change in the quadrature channel. In other words, having the quadrature component, $\cos(\omega t)$, in the driving voltages is a way to incorporate an additional sensing channel (i.e., both an in-phase and a quadrature sensing channel), and having the same polarity for the quadrature components in the driving voltages is a way to derive out-of-plane displacement information in the quadrature sensing channel. Finally, the amplitude of the driving voltage for both in-phase ($A_{IN}$) and quadrature ($A_z$) sensing channel should be chosen to be as large as possible to provide a high sensitivity or signal-to-noise ratio (SNR) under a given voltage supply limitation. A compromise can to be made regarding which channel needs a larger amplitude for a higher SNR.

Electrodes 62, 66, 72 and 74 form a first capacitive sensor, and electrodes 64, 68, 72 and 74 form a second capacitive sensor. The capacitance of the first capacitive sensor is $C_+$, and the capacitance of the second capacitive sensor is $C_-$.

The sensor signal $V_{SENS}$ is multiplied by a first reference signal, also called a first mixing signal ($V1_{MIX}=A_{MIX}\cos(\omega t)$) in a first mixer 112, and a second reference signal, also called a second mixing signal ($V2_{MIX}=A_{MIX}\sin(\omega t)$) in a second mixer 114. The outputs of the mixers are then lowpass filtered by filters 116 and 118 respectively, to produce the carrier frequency components $V_{IN\text{-}PHASE\ DEMOD}$, and $V_{OUT\text{-}OF\text{-}PHASE\ DEMOD}$:

$$V_{IN\text{-}PHASEDEMOD} = \frac{A_{MIX}}{2}(\omega R_{SENS} A_{IN} C_{DIFF}); \text{ and}$$
$$V_{OUT\text{-}OF\text{-}PHASEDEMOD} = \frac{A_{MIX}}{2}(\omega R_{SENS} A_z C_{SUM}),$$

where $C_{DIFF}=C_+-C_-$, and $C_{SUM}=C_++C_-$.

Signals $V_{IN\text{-}PHASEDEMOD}$, and $V_{OUT\text{-}OF\text{-}PHASEDEMOD}$ represent the amount of relative in-plane and out-of-plane displacement of the electrodes that form the first and second capacitive sensors. If the example of FIG. 7 is applied to a data storage device, these signals can be used by a servo control system to adjust the positioning of the recording heads with respect to the data storage media.

The example of FIG. 7 uses both sine and cosine phase components of a modulation voltage frequency to provide simultaneous detection of in-plane and out-of-plane position information in a capacitive sensor system. The $V_{IN\text{-}PHASEDEMOD}$, and $V_{OUT\text{-}OF\text{-}PHASEDEMOD}$ signals can be used to compensate for the adverse effects of out-of-plane variations on in-plane position information sensing.

FIGS. 8 and 9 are graphs of capacitance versus lateral position. These graphs illustrate a simulated $C_{SUM}$ and $C_{DIFF}$ variation over various lateral position offsets of the media electrodes with respect to the sense electrodes. The media electrodes can be mounted, for example, on the media or on another structure coupled to the media. The sense electrodes can be mounted, for example, on a head substrate.

The apparatus of FIG. 7 can be implemented in a simple circuit without the need for an analog switch (which can be an additional noise source) and its timing/synchronization circuit. In addition, the apparatus of FIG. 7 does not impose any constraint on servo sampling frequency. Therefore, the servo sampling frequency can be set high enough to satisfy operational shock requirements in probe storage for mobile applications.

The capacitive sensor arrangement in FIG. 7 illustrates the working principle of a particular capacitive in-plane position sensor. The actual physical quantity sensitive to the in-plane displacement is the relative overlap area of bottom (or sense) electrode with two opposite-phase top (or driving) electrodes.

Figure 10:
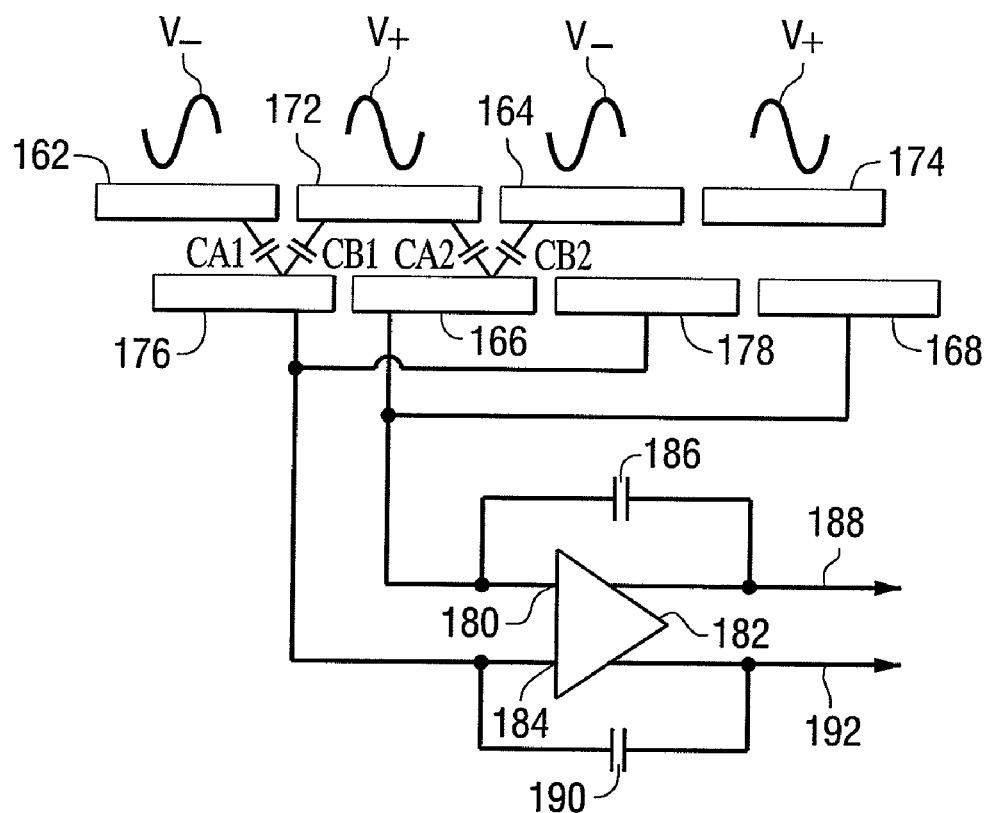
FIG. 10 is a schematic diagram of another capacitive position sensor.

There are variations of the capacitive sensor scheme that allow for increased sensitivity. For example, FIG. 10 illustrates a double-differential scheme, which has a doubled sensitivity. In FIG. 10, there are four capacitors. A first capacitor sensor CA1 includes electrodes 162, 164, 176 and 178; a second capacitor sensor CB1 includes electrodes 172, 174, 176 and 178; a third capacitor sensor CA2 includes electrodes 172, 174, 166 and 168; and a fourth capacitor sensor CB2 includes 162, 164, 166 and 168. The electrodes 172 and 174 are driven by $V_+$ and the electrode 162 and 164 are driven by $V_-$, which is in opposite phase with respect to $V_+$. The first and second capacitive sensors are connected to a first input 180 of an operational amplifier 182. The third and fourth capacitive sensors are connected to a second input 184 of the operational amplifier 182. In this configuration, (CA1–CB1) dV+/dt=−(CA2–CB2)dV+/dt, CA1=CA2=CA, and CB1=CB2=CB. A first feedback capacitor 186 is connected between a first output 188 of the operational amplifier and the first input. A second feedback capacitor 190 is connected between a second output 192 of the operational amplifier and the second input. The signal between the outputs 188 and 192 is proportional to twice the difference between CB and CA.

In another aspect of the invention, the orthogonal phase (i.e., sine and cosine) of the modulation voltage need not be used. In this aspect, a separate modulation voltage frequency can be used to determine the out-of-plane information as illustrated in FIG. 11.

Figure 11:
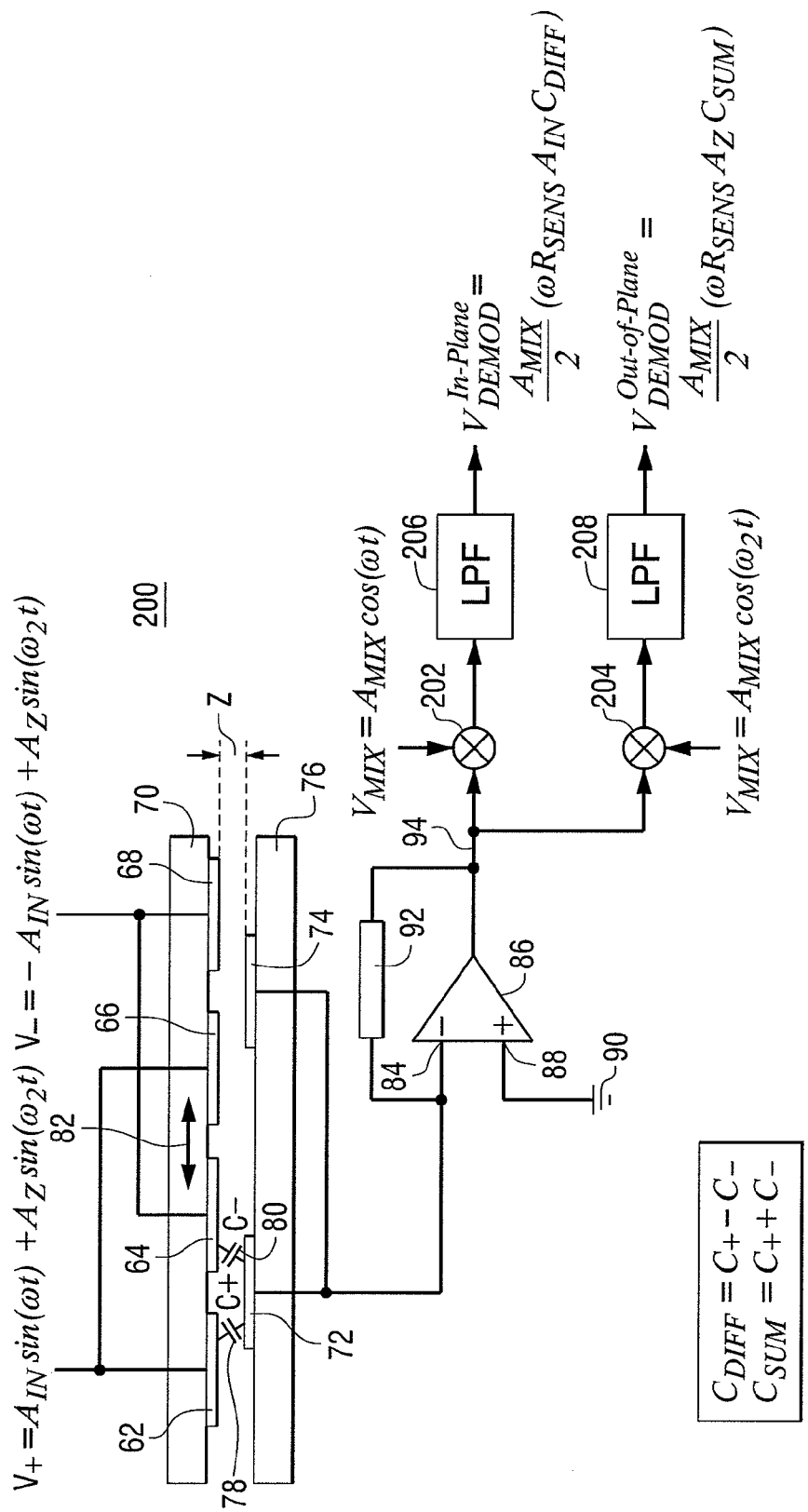
FIG. 11 is a schematic diagram of a capacitive position sensor constructed in accordance with another aspect of the invention.

FIG. 11 shows an example apparatus 200 in which electrodes 62 and 66 are driven by a voltage $V+=A_{IN} \sin(\omega t)+A_z \sin(\omega t)$, and electrodes 64 and 68 are driven by a voltage $V_-=-A_{IN} \sin(\omega t)+A_z \sin(\omega t)$. Electrodes 62, 66, 72 and 74 form a first capacitive sensor, and electrodes 64, 68, 72 and 74 form a second capacitive sensor. The capacitance of the first capacitive sensor is C+, and the capacitance of the second capacitive sensor is C−.

Both modulation voltages include components at each of the two frequencies. In this way the sensing channel can have two channels: one with $\omega$ for in-plane displacement and another with $\omega_2$ for out-of-plane displacement (or vice versa).

In this example, the sensor signal $V_{SENS}$ is multiplied by a first mixing signal ($V1_{MIX}=A_{MIX}\cos(\omega t)$) in a first mixer 202, and a second mixing signal ($V2_{MIX}=A_{MIX}\cos(\omega t)$) in a second mixer 204. The outputs of the mixers are then lowpass filtered by filters 206 and 208 respectively, to produce the carrier frequency components $V_{IN-PHASEDEMOD}$, and $V_{OUT-OF-PHASEDEMOD}$:

$$V_{IN-PHASEDEMOD} = \frac{A_{MIX}}{2}(\omega R_{SENS} A_{IN} C_{DIFF}); \text{ and}$$

$$V_{OUT-OF-PHASEDEMOD} = \frac{A_{MIX}}{2}(\omega R_{SENS} A_Z C_{SUM}),$$

where $C_{DIFF}=C_+-C_-$, and $C_{SUM}=C_++C_-$.

In this example, the frequency separation between $\omega$ and $\omega_2$ should be larger than the bandwidth of the lowpass filters in order to avoid coupling between the two channels.

Figure 12:
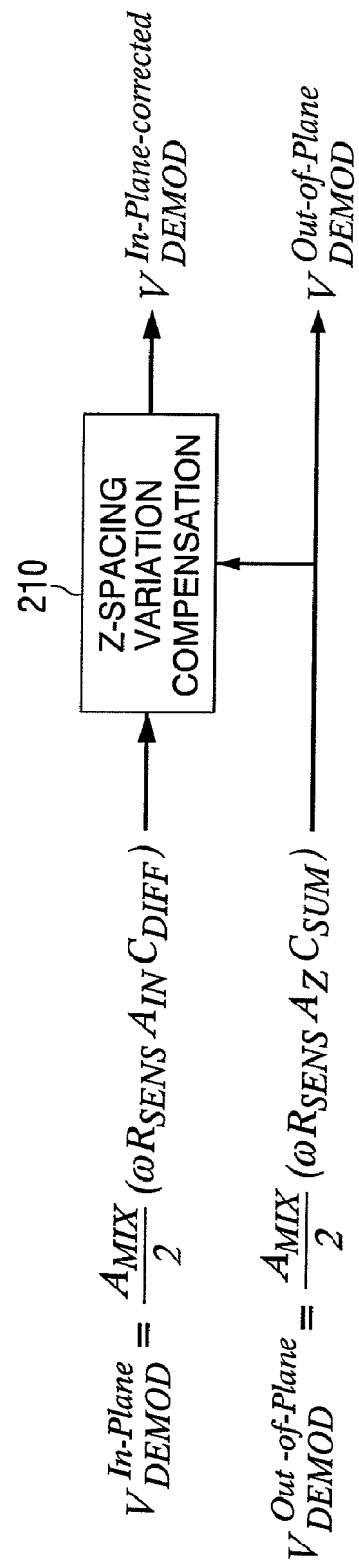
FIG. 12 is a schematic diagram of a compensation circuit.

After obtaining both in-plane and out-of-plane position information from the capacitive sensor, the final in-plane (e.g., tracking and scanning) position information, corrected for the Z-spacing variation, can be derived by a Z-spacing variation compensation block 210 as is shown in FIG. 12. In one example, the compensation can be implemented by a simple adjustable gain circuit in block 210; increasing or decreasing gain for a larger or smaller out-of-plane position, respectively. The adjustable gain can further be implemented by using a look-up table; specifying different amplification/attenuation gain for in-plane position information depending on the out-of-position information.

FIG. 12 shows a Z-spacing variation compensation block 210 utilizing both in-plane and out-of-plane position information from capacitive sensors to derive corrected in-plane position information represented by a voltage signal:

$V_{\textit{In-Plane-Corrected DEMOD}}.$

In the case of non-feedback type compensation as is shown in FIG. 12, there is no concern regarding the stability of the compensation loop. Although the sensing output remains accurate, the sensor sensitivity may drop and hence the noise becomes larger for a larger air gap.

Figure 13:
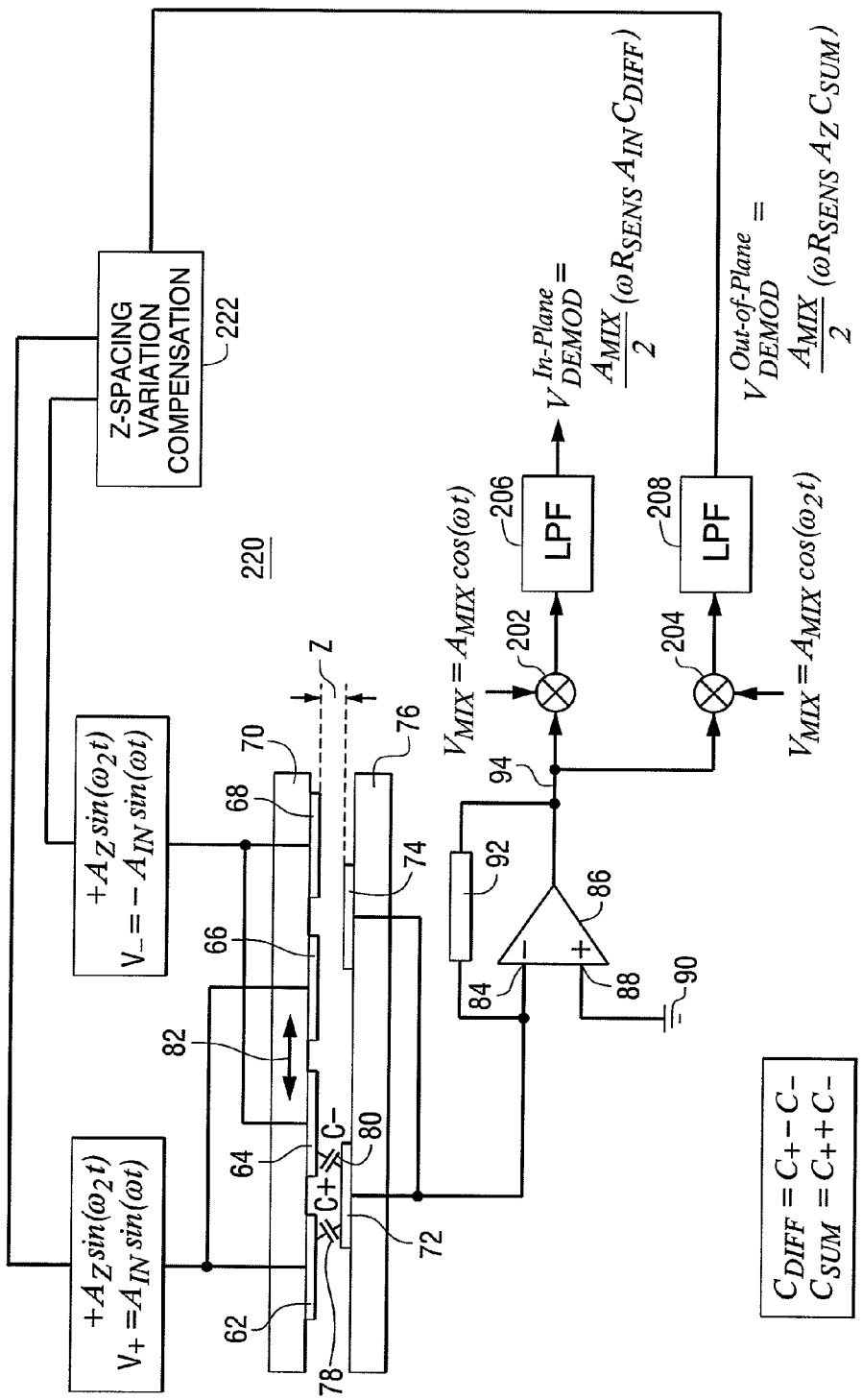
FIG. 13 is a schematic diagram of a capacitive position sensor constructed in accordance with another aspect of the invention.

Alternatively, the compensation can be implemented in a feedback fashion as is illustrated in the apparatus 220 of FIG. 13. In this example, out-of-plane position information is utilized to adjust the driving voltage amplitude in a feedback fashion using Z-spacing compensation to increase or decrease $V_{IN}$ when the gap in the Z-direction is increasing or decreasing, respectively. In this case, the sensing sensitivity also can remain unchanged.

The examples described above provide an increased robustness of capacitive sensor in-plane position detection against out-of-plane spacing variation by allowing the simultaneous detection of both in-plane and out-of-plane position information; thereby compensating for the adverse effects of out-of-plane spacing variation on the in-plane position detection required for a nm-precision tracking and scanning servo.

FIG. 13 includes a Z-spacing variation compensation block 222 utilizing out-of-plane position information from the capacitive sensor to adjust the driving voltage amplitude in a feedback fashion (i.e., increasing or decreasing $V_{IN}$ when gap (Z−) is increasing or decreasing).

The amplitude of in-plane component of the driving voltage, $A_{IN}$, is adjusted based on the out-of-plane displacement information. In this case, out-of-plane position information is utilized to adjust the driving voltage amplitude in a feedback fashion (i.e., to increase/decrease $V_{IN}$ when gap (z−) is increasing/decreasing).

The described examples do not impose any constraint on the servo sampling frequency. Therefore, the servo sampling frequency can be set high enough to satisfy operational shock specifications for probe type storage devices in mobile applications. The invention can be applied to other capacitive position sensing applications, in which either the in-plane position needs to be sensed with some tolerance for Z-direction gap variations due to e.g., mechanical disturbances/instability, or the in-plane and out-of-plane positions need to be measured at the same time without an additional sensor set or other configuration for out-of-plane position sensing.

The implementations described above and other implementations are within the scope of the following claims.

What is claimed is:

1. An apparatus for simultaneously detecting in-plane and out-of-plane position displacement of a capacitive sensor in a data storage device, comprising:
   a capacitive sensor having a first electrode connected to a first AC supply voltage operating at a first frequency;
   a second electrode connected to a second AC supply voltage operating at the first frequency, wherein each of the first and second supply voltages includes an in-phase component and a quadrature component, and a third electrode;
   a sensing circuit for producing a sense voltage in response to current flowing between the first electrode and the third electrode, and between the second electrode and the third electrode;
   a first mixer for combining the sense voltage with a first AC reference voltage to produce a first signal representative of in-plane displacement of the first and second electrodes with respect to the third electrode of the capacitive sensor; and
   a second mixer for combining the sense voltage with a second AC reference voltage to produce a second signal representative of out-of-plane displacement of the first and second electrodes with respect to the third electrode of the capacitive sensor in the data storage device.

2. The apparatus of claim 1, wherein the in-phase component of the second supply voltage has a phase opposite to the phase of the in-phase component of the first supply voltage.

3. The apparatus of claim 1, wherein the quadrature component of the first supply voltage and the quadrature component of the second supply voltage have the same phase.

4. The apparatus of claim 1, further comprising:
a compensation circuit for correcting a component of at least one of the first and second supply voltages in response to at least one of the first and second signals.

5. The apparatus of claim 1, further comprising:
a first bandpass filter for filtering the first signal; and
a second bandpass filter for filtering the second signal.

6. The apparatus of claim 1, wherein the sensing circuit comprises:
an amplifier having an output, an inverting input connected to the third electrode, and a non-inverting input; and
a resistor connected between the output and the inverting input.

7. The apparatus of claim 1, wherein the sensing circuit comprises:
an amplifier having an output, an inverting input connected to the third electrode, and a non-inverting input; and
a capacitor connected between the output and the inverting input.

8. The apparatus of claim 1, further comprising:
a fourth electrode;
wherein the sensing circuit comprises:
an amplifier having first and second outputs, and first and second inputs, wherein the third electrode is connected to the first input and the fourth electrode is connected to the second input;
a first capacitor connected between the first output and the first input; and
a second capacitor connected between the second output and the second input.

9. An apparatus for simultaneously detecting in-plane and out-of-plane position displacement of capacitive sensors in a data storage device, comprising:
a capacitive sensor having a first electrode connected to a first AC supply voltage having a first component at a first frequency and a second component at a second frequency;
a second electrode connected to a second AC supply voltage having a first component at the first frequency and the second component at the second frequency, and a third electrode;
a sensing circuit for producing a sense voltage in response to current flowing between the first electrode and the third electrode, and between the second electrode and the third electrode;
a first mixer for combining the sense voltage with a first AC reference voltage to produce a first signal representative of in-plane displacement of the first and second electrodes with respect to the third electrode of the capacitive sensor; and
a second mixer for combining the sense voltage with a second AC reference voltage to produce a second signal representative of out-of-plane displacement of the first and second electrodes with respect to the third electrode of the capacitive sensor in the data storage device.

10. The apparatus of claim 9, wherein the first component of the second supply voltage has a phase opposite to the phase of the first component of the first supply voltage.

11. The apparatus of claim 9, wherein the second component of the first supply voltage and the second component of the second supply voltage have the same phase.

12. The apparatus of claim 9, further comprising:
a compensation circuit for correcting a component of at least one of the first and second supply voltages in response to at least one of the first and second signals.

13. The apparatus of claim 9, further comprising:
a first bandpass filter for filtering the first signal; and
a second bandpass filter for filtering the second signal.

14. The apparatus of claim 9, wherein the sensing circuit comprises:
an amplifier having an output, an inverting input connected to the third electrode, and a non-inverting input; and
a resistor connected between the output and the inverting input.

15. The apparatus of claim 9, wherein the sensing circuit comprises:
an amplifier having an output, an inverting input connected to the third electrode, and a non-inverting input; and
a capacitor connected between the output and the inverting input.

16. The apparatus of claim 9, further comprising:
a fourth electrode; and
wherein the sensing circuit comprises:
an amplifier having first and second outputs, and first and second inputs, wherein the third electrode is connected to the first input and the fourth electrode is connected to the second input;
a first capacitor connected between the first output and the first input; and
a second capacitor connected between the second output and the second input.

17. A method for simultaneously detecting in-plane and out-of-plane position displacement of a capacitive sensor in a data storage device, comprising:
connecting a first electrode of a capacitive sensor to a first supply voltage;
connecting a second electrode of the capacitive sensor to a second supply voltage;
producing a sense voltage in response to current flowing in the first and second electrodes and a third electrode of the capacitive sensor;
combining the sense voltage with a first AC reference voltage to produce a first signal representative of in-plane displacement of the first and second electrodes with respect to the third electrode of the capacitive sensor in the data storage device;
combining the sense voltage with a second AC reference voltage to produce a second signal representative of out-of-plane displacement of the first and second electrodes with respect to the third electrode of the capacitive sensor in the data storage device.

18. The method of claim 17, wherein each of the first and second supply voltages includes an in-phase component and a quadrature component.

* * * * *

UNITED STATES PATENT AND TRADEMARK OFFICE
CERTIFICATE OF CORRECTION

PATENT NO. : 7,570,066 B2 Page 1 of 1
APPLICATION NO. : 11/933729
DATED : August 4, 2009
INVENTOR(S) : Juil Lee It is certified that error appears in the above-identified patent and that said Letters Patent is hereby corrected as shown below:

Detailed Description of the Invention

Column 5, Line 28
"...$V=-A_{IN}\sin(\omega t)+A_2\cos(\omega t)$." should read "...$V_-=-A_{IN}\sin(\omega t)+A_z\cos(\omega t)$."

Column 7, Line 10
"...$\sin(\omega t)$,..." should read "...$\sin(\omega_2 t)$,"

Column 7, Line 11
"...$V_-=-A_{IN}\sin(\omega t)+A_z\sin(\omega t)$." should read "...$V_-=-A_{IN}\sin(\omega t)+A_z\sin(\omega_2 t)$."

Column 7, Line 22
"...$(V2_{MIX}=A_{MIX}\cos(\omega t))$..." should read "...$(V2_{MIX}=A_{MIX}\cos(\omega_2 t))$"

Signed and Sealed this

Eighteenth Day of May, 2010

David J. Kappos
*Director of the United States Patent and Trademark Office*